(12) United States Patent
Kariatsumari et al.

(10) Patent No.: US 8,494,715 B2
(45) Date of Patent: Jul. 23, 2013

(54) VEHICLE STEERING APPARATUS

(75) Inventors: Yuji Kariatsumari, Yamatotakada (JP); Yoshinobu Shimizu, Sakai (JP); Hayato Komatsu, Aichi (JP)

(73) Assignee: JTEKT Corporation, Osaka (JP)

( * ) Notice: Subject to any disclaimer, the term of this patent is extended or adjusted under 35 U.S.C. 154(b) by 728 days.

(21) Appl. No.: 12/588,399

(22) Filed: Oct. 14, 2009

(65) Prior Publication Data
US 2010/0094505 A1    Apr. 15, 2010

(30) Foreign Application Priority Data
Oct. 15, 2008    (JP) .................................. 2008-266344

(51) Int. Cl.
  *B62D 5/04*    (2006.01)
(52) U.S. Cl.
  CPC .............. *B62D 5/0472* (2013.01); *B62D 5/046* (2013.01)
  USPC ............ 701/41; 701/42; 701/43; 318/400.32; 318/611
(58) Field of Classification Search
  CPC ................................ B62D 5/046; B62D 5/0472
  USPC ...................... 701/41, 91, 2, 42, 43; 180/412, 180/415, 422, 446; 318/400.32, 611
  See application file for complete search history.

(56) References Cited

U.S. PATENT DOCUMENTS

| | | | |
|---|---|---|---|
| 5,276,624 A * | 1/1994 | Ito et al. ........................... | 701/72 |
| 6,081,093 A * | 6/2000 | Oguro et al. .................. | 318/807 |
| 6,687,590 B2 * | 2/2004 | Kifuku et al. .................. | 701/43 |
| 7,406,375 B2 * | 7/2008 | Fujita et al. ..................... | 701/41 |
| 7,659,685 B2 | 2/2010 | Cesario et al. | |
| 2005/0273235 A1 * | 12/2005 | Ohta et al. ....................... | 701/41 |
| 2007/0192005 A1 * | 8/2007 | Ishikawa et al. ................ | 701/41 |
| 2007/0229021 A1 | 10/2007 | Yoshida et al. | |
| 2010/0168964 A1 | 7/2010 | Higashi et al. | |

FOREIGN PATENT DOCUMENTS

| | | |
|---|---|---|
| EP | 1 885 054 A1 | 2/2008 |
| JP | A-2007-118823 | 5/2007 |
| JP | A-2007-267549 | 10/2007 |
| JP | A-2008-087672 | 4/2008 |

OTHER PUBLICATIONS

Kim et al., "New Approach for High-Performance PMSM Drives without Rotational Position Sensors", IEEE Transactions on Power Electronics, vol. 12 No. 5, Sep. 1997, pp. 904-911.*
Consoli et al., "Sensorless IPMS motor drive control for electric power steering", Power Electronics Specialists Conference (PESO 2008), Jun. 15-19, 2008, pp. 1488-1494.*
Jan. 18, 2013 Office Action issued in Japanese Patent Application No. 2008-266344 (with translation).
Office Action dated Feb. 25, 2013 issued in Chinese Patent Application No. 200910205821.8 (with translation).

* cited by examiner

*Primary Examiner* — James Trammell
*Assistant Examiner* — Todd Melton
(74) *Attorney, Agent, or Firm* — Oliff & Berridge, PLC

(57) ABSTRACT

A motor is driven based on an axis current value in a rotating coordinate system that rotates in accordance with a control angle that is a rotational angle used in a control. The control angle is calculated by adding an addition angle to an immediately preceding value of the control angle in each predetermined calculation cycle. A command steering torque is set based on a predetermined steering angle-torque characteristic. The addition angle is calculated based on the deviation of a detected steering torque from a command steering torque. The addition angle based on the deviation is changed when a predetermined condition is satisfied.

11 Claims, 12 Drawing Sheets

F I G . 2
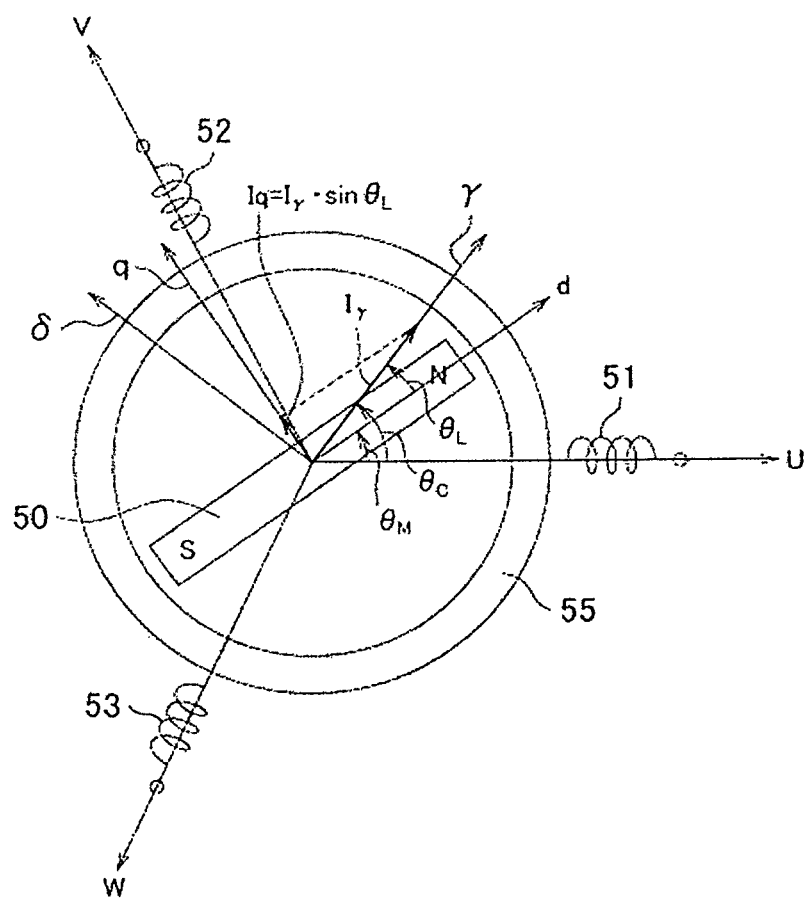

F I G . 7
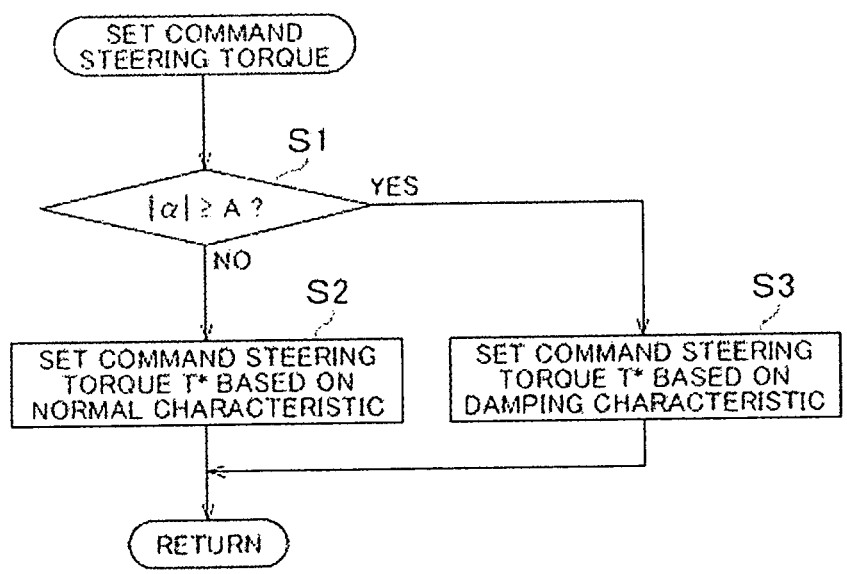

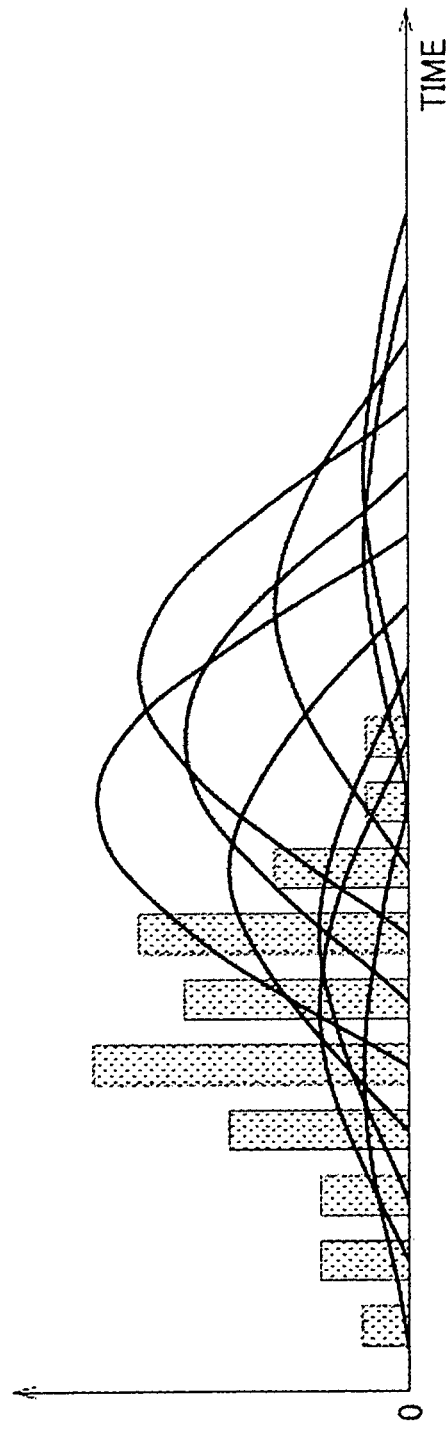

VEHICLE STEERING APPARATUS

INCORPORATION BY REFERENCE

The disclosure of Japanese Patent Application No. 2008-266344 filed on Oct. 15, 2008 including the specification, drawings and abstract is incorporated herein by reference in its entirety.

BACKGROUND OF THE INVENTION

1. Field of the Invention

The invention relates to a vehicle steering apparatus that includes a motor control unit used to drive a brushless motor.

2. Description of the Related Art

An example of a vehicle steering apparatus is an electric power steering apparatus. A brushless motor is used as a drive source that supplies a driving force to a steering mechanism of a vehicle. A motor control unit that controls driving of a brushless motor is usually configured to control the electric current that is supplied to a motor based on the output from a rotational angle sensor that detects the rotational angle of a rotor. As a rotational angle sensor, a resolver that outputs a sine-wave signal and a cosine-wave signal that correspond to the rotational angle (electrical angle) of a rotor is usually used. However, a resolver is expensive, and needs a large number of wires and a large installation space. Therefore, using a resolver as a rotational angle sensor hinders reduction in cost and size of a unit that includes a brushless motor.

US Patent No. 2007/0229021 A1 describes a sensorless drive method for driving a brushless motor without using a rotational angle sensor. According to the sensorless drive method, the induced voltage that varies depending on the rotational speed of a rotor is estimated in order to estimate the phase of a magnetic pole (electrical angle of the rotor). When the rotor is at a standstill or rotating at a considerably low speed, it is not possible to estimate the induced voltage. Therefore, the phase of the magnetic pole is estimated by another method. More specifically, a sensing signal is input in a stator, and a response of the motor to the sensing signal is detected. Then, the rotational position of the rotor is estimated based on the response of the motor.

SUMMARY OF THE INVENTION

It is an object of the invention to provide a vehicle steering apparatus in which a motor is controlled by a new control method that does not require a rotational angle sensor.

An aspect of the invention relates to a vehicle steering apparatus in which a driving force is supplied to a steering mechanism for a vehicle from a motor that includes a rotor and a stator that faces the rotor. A current drive unit drives the motor based on an axis current value in a rotating coordinate system that rotates in accordance with a control angle that is a rotational angle used in a control. A control angle calculation unit obtains a current value of the control angle by adding an addition angle to an immediately preceding value of the control angle in each predetermined calculation cycle. A steering angle detection unit detects a steering angle of the steering mechanism. A torque detection unit detects a steering torque applied to an operation member that is operated to steer the vehicle. A command steering torque setting unit sets a command steering torque that corresponds to the steering angle detected by the steering angle detection unit based on a predetermined steering angle-torque characteristic. An addition angle calculation unit calculates the addition angle based on the deviation of the detected steering torque detected by the torque detection unit from the command steering torque set by the command steering torque setting unit. The addition angle based on the deviation is changed when a predetermined condition is satisfied.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 2 is a view illustrating the configuration of a motor;

FIG. 7 is a flowchart illustrating the routine executed by a command steering torque setting unit;

FIG. 11 is a graph illustrating overlaps among the damping correction values that are calculated at different times;

DETAILED DESCRIPTION OF THE EXAMPLE EMBODIMENTS

Figure 1:
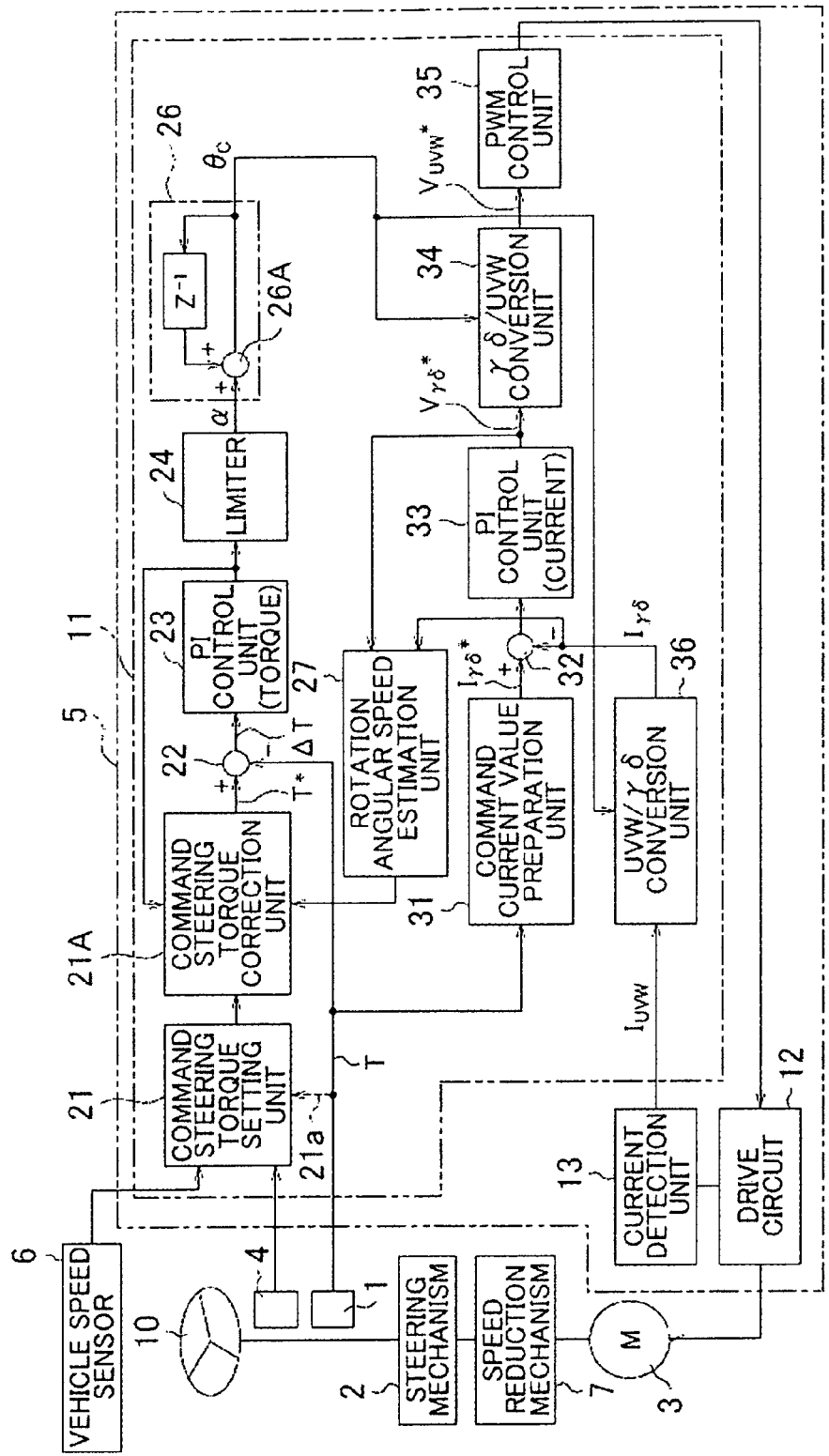
FIG. 1 is a block diagram illustrating the electrical configuration of an electric power steering apparatus used as a vehicle steering apparatus according to a first embodiment of the invention.

Hereafter, example embodiments of the invention will be described with reference to the accompanying drawings. FIG. 1 is a block diagram illustrating the electrical configuration of an electric power steering apparatus used as a vehicle steering apparatus according to a first embodiment of the invention. The electric power steering apparatus includes a torque sensor 1 that detects the steering torque T that is applied to a steering wheel 10 that serves as an operation member used to steer a vehicle, a motor 3 (brushless motor) that applies a steering assist force to a steering mechanism 2 of the vehicle via a speed reduction mechanism 7, a steering angle sensor 4 that detects the steering angle that is the rotational angle of the steering wheel 10 (corresponding the steering angle of the steering mechanism 2), a motor control unit 5 that controls driving of the motor 3, and a vehicle speed sensor 6 that detects the speed of the vehicle in which the electric power steering apparatus is mounted.

The motor control unit 5 controls driving of the motor 3 based on the steering torque detected by the torque sensor 1, the steering angle detected by the steering angle sensor 4, and the vehicle speed detected by the vehicle speed sensor 6, thereby providing appropriate steering assistance based on the steering state and the vehicle speed.

In the first embodiment, the motor 3 is a three-phase brushless motor. As illustrated in FIG. 2, the motor 3 includes a rotor 50 that serves as a field magnet, and a U-phase stator coil 51, a V-phase stator coil 52, and a W-phase stator coil 53 that are arranged on a stator 55 that faces the rotor 50. The motor 3 may be an inner rotor motor in which a stator is arranged on the outer side of a rotor so as to face the rotor, or an outer rotor motor in which a stator is arranged on the inner side of a tubular rotor so as to face the rotor.

A three-phase fixed coordinate system (UVW coordinate system), where the direction in which the U-phase stator coil 51 extends, the direction in which the V-phase coil 52 extends, and the direction in which the W-phase coil 53 extends are used as the U-axis, the V-axis and W-axis, respectively, is defined. In addition, a two-phase rotating coordinate system (dq coordinate system: actual rotating coordinate system), where the direction of the magnetic poles of the rotor 50 is used as the d-axis (axis of the magnetic poles) and the direction that is perpendicular to the d-axis within the rotary plane of the rotor 50 is used as the q-axis (torque axis), is defined. The dq coordinate system is a rotating coordinate system that rotates together with the rotor 50. In the dq coordinate system, only the q-axis current contributes to generation of torque by the rotor 50. Therefore, the d-axis current may be set to 0 and the q-axis current may be controlled based on a desired torque. The rotational angle (rotor angle) $\theta M$ of the rotor 50 is a rotational angle of the d-axis with respect to the U-axis. The dq coordinate system is an actual rotating coordinate system that rotates in accordance with the rotor angle $\theta M$. With the use of the rotor angle $\theta M$, coordinate conversion may be made between the UVW coordinate system and the dq coordinate system.

In the first embodiment, the control angle $\theta C$ that indicates the rotational angle used in the control is employed. The control angle $\theta C$ is an imaginary rotational angle with respect to the U-axis. An imaginary two-phase rotating coordinate system ($\gamma\delta$ coordinate system: hereinafter, referred to as "imaginary rotating coordinate system", and the coordinate axis of the imaginary rotating coordinate system will be referred to as "imaginary axis"), where the imaginary axis that forms the control angle $\theta C$ with the U-axis is used as the $\gamma$-axis, and the axis that is advanced 90 degrees from the $\gamma$-axis is used as the $\delta$-axis, is defined. When the control angle $\theta C$ is equal to the rotor angle $\theta M$, the $\gamma\delta$ coordinate system, which is the imaginary rotating coordinate system, and the dq coordinate system, which is the actual rotating coordinate system, coincide with each other. That is, the $\gamma$-axis, which is the imaginary axis, coincides with the d-axis, which is the actual axis, and the $\delta$-axis, which is the imaginary axis, coincides with the q-axis, which is the actual axis. The $\gamma\delta$ coordinate system is an imaginary rotating coordinate system that rotates in accordance with the control angle $\theta C$. Coordinate conversion may be made between the UVW coordinate system and the $\gamma\delta$ coordinate system with the use of the control angle $\theta C$.

The load angle $\theta L$ ($=\theta C - \theta M$) is defined based on the difference between the control angle $\theta C$ and the rotor angle $\theta M$. When the $\gamma$-axis current $I\gamma$ is supplied to the motor 3 based on the control angle $\theta C$, the q-axis component of the $\gamma$-axis current $I\gamma$ (orthogonal projection to the q-axis) is used as the q-axis current Iq that contributes to generation of torque by the rotor 50. That is, the relationship expressed by Equation 1 is established between the $\gamma$-axis current $I\gamma$ and the q-axis current Iq.

$$Iq = I\gamma \times \sin \theta L \qquad \text{Equation 1}$$

Referring again to FIG. 1, the motor control unit 5 includes a microcomputer 11, a drive circuit (inverter circuit) 12 that is controlled by the microcomputer 11 and that supplies electric power to the motor 3, and a current detection unit 13 that detects an electric current that flows through the stator coil of each phase of the motor 3.

The current detection unit 13 detects the U-phase current IU, the V-phase current IV and the W-phase current IW that flow through the U-phase stator coil 51, the V-phase stator coil 52, and the W-phase stator coil 53 of the motor 3, respectively, (these phase currents will be collectively referred to as "three-phase detected current IUVW" where appropriate). The U-phase current IU, the V-phase current IV and the W-phase current IW are the current values in the directions of the axes of the UVW coordinate system.

The microcomputer 11 includes a CPU and memories (a ROM, a RAM, etc.), and serves as multiple function processing units by executing predetermined programs. The multiple function processing units include a command steering torque setting unit 21, a command steering torque correction unit 21A, a torque deviation calculation unit 22, a PI (proportional integral) control unit 23, a limiter 24, a control angle calculation unit 26, a rotation angular speed estimation unit 27, a command current value preparation unit 31, a current deviation calculation unit 32, a PI control unit 33, a $\gamma\delta$/UVW conversion unit 34, a PWM (Pulse Width Modulation) control unit 35, and a UVW/$\gamma\delta$ conversion unit 36.

The command steering torque setting unit 21 sets the command steering torque T* based on the steering angle detected by the steering angle sensor 4 and the vehicle speed detected by the vehicle speed sensor 6. For example, the command steering torque T* when the steering angle is a positive value (when the steering wheel 10 is operated clockwise) is set to a positive value (torque applied in the clockwise direction), and the command steering torque T* when the steering angle is a negative value (when the steering wheel 10 is operated counterclockwise) is set to a negative value (torque applied in the counterclockwise direction), based on, for example, the normal characteristic shown in FIG. 4A. The command steering torque T* is set in such a manner that the absolute value of the command steering torque T* increases (linearly increases, in the example in FIG. 4A) as the absolute value of the steering angle increases. However, the command steering torque T* is set to a value within a range between a predetermined upper limit (positive value (e.g. +6 Nm)) and a predetermined lower limit (negative value (e.g. −6 Nm)). In addition, the command steering torque T* is set in such a manner that the absolute value of the command steering torque T* decreases as the vehicle speed increases. That is, a vehicle speed-sensitive control is executed.

Figure 4A:
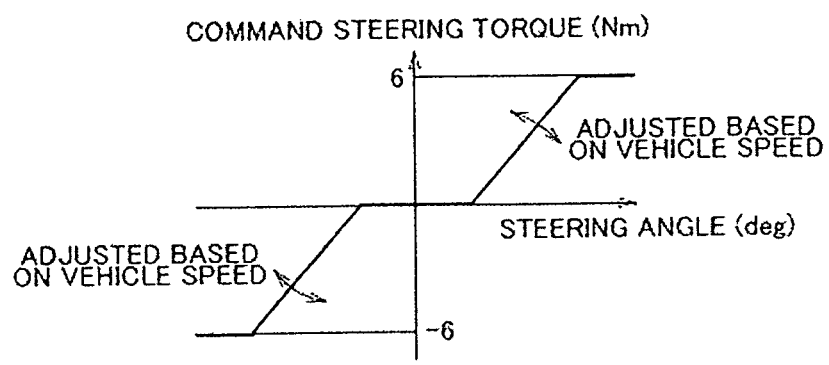
FIGS. 4A and 4B are graphs each showing an example of the characteristic of the command steering torque with respect to the steering angle.
Figure 4B:
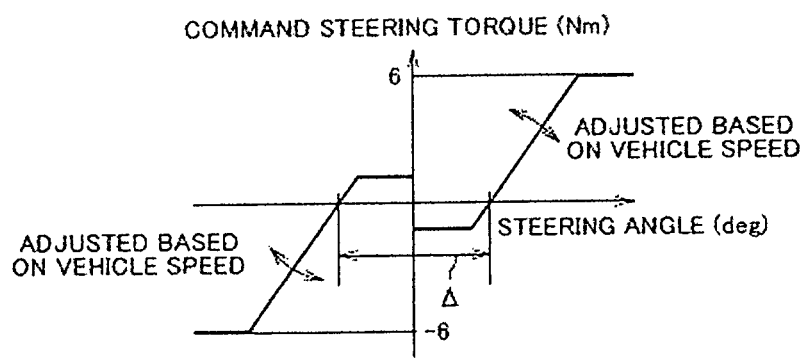

When the amount of change in the control angle $\theta C$ is large, the command steering torque setting unit 21 sets the command steering torque T* with respect to the steering angle based on the damping characteristic shown in FIG. 4B. According to the damping characteristic, within a predetermined steering angle region $\Delta$ that includes the steering angle neutral point, the steering angle and the command steering torque T* are opposite in sign. Outside the predetermined steering angle region $\Delta$, the steering angle and the command steering torque T* are in the same sign. More specifically, within the region in which the steering angle is equal to or larger than 0, the command steering torque T* is set based on the characteristic line that is obtained by shifting the characteristic line of the first quadrant of the normal characteristic shown in FIG. 4A in the negative direction along the command steering torque coordinate axis. However, the upper limit and the lower limit are not changed. In the region in which the steering angle is a negative value, the command steering torque T* is set based on the characteristic line that is obtained by shifting the characteristic line of the third quadrant of the normal characteristic shown in FIG. 4A in the positive direction along the command steering torque coordinate axis. In this case as well, the upper limit and the lower limit are not changed.

As a result of changes in the characteristic described above, when the steering angle is within a steering angle region near the steering angle neutral point in the damping characteristic shown in FIG. 4B, the motor 3 generates a torque that counters the steering torque that directs the steering wheel 10 toward the steering angle neutral point. Thus, a change in the steering angle is suppressed in the state where the steering wheel 10 is returned to the steering angle neutral point at a high speed (e.g. equal to or higher than 200 deg/sec) by a reaction force from a road surface (e.g. in the state where a driver takes hands off the steering wheel 10). In this way, a so-called damping control is realized, and the convergence near the steering angle neutral point is improved.

Figure 5:
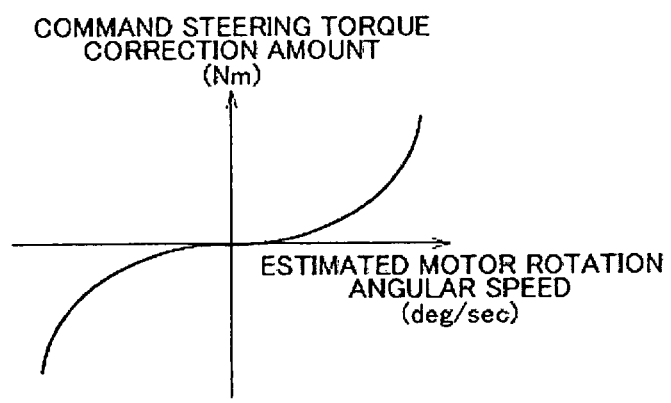
FIG. 5 is a graph showing the characteristic of the command steering torque correction amount with respect to the estimated motor rotation angular speed.

The command steering torque correction unit 21A corrects the command steering torque T* set by the command steering torque setting unit 21 to obtain the corrected command steering torque T*. The command steering torque correction unit 21A calculates the command steering torque correction amount corresponding to the estimated motor rotation angular speed based on the characteristic shown in FIG. 5. The command steering torque correction unit 21A adds the command steering torque correction amount to the command steering torque T* set by the command steering torque setting unit 21.

The estimated motor rotation angular speed is a positive value when the steering wheel 10 is operated in the clockwise direction, and is a negative value when the steering wheel 10 is operated in the counterclockwise direction. The correction amount is a positive value when the estimated motor rotation angular speed is a positive value, and is a negative value when the estimated motor rotation angular speed is a negative value. The absolute value of the correction amount increases more monotonously (in the first embodiment, nonlinearly) as the absolute value of the estimated motor rotation angular speed increases. A good response to a quick steering operation is obtained by adding the correction amount having such characteristic to the command steering torque T*. In addition, a change in the steering angle is suppressed in the state where the steering wheel 10 is returned to the steering angle neutral point at a high speed by the reaction force from the road surface. Thus, it is possible to realize the so-called damping control, and thereby obtaining an excellent steering feel.

The torque deviation calculation unit 22 obtains the deviation (torque deviation) $\Delta T$ of the steering torque T detected by the torque sensor 1 (hereinafter, referred to as "detected steering torque T" so as to be distinguished from the command steering torque T*) from the command steering torque T* that is set by the command steering torque setting unit 21 and then corrected by the command steering torque correction unit 21A. The PI control unit 23 executes the PI calculation on the torque deviation $\Delta T$. That is, the torque deviation calculation unit 22 and the PI control unit 23 constitute a torque feedback control unit that brings the detected steering torque T to the command steering torque T*. The PI control unit 23 calculates the addition angle $\alpha$ for the control angle $\theta C$ by executing the PI calculation on the torque deviation $\Delta T$.

The limiter 24 is a limiting unit that imposes limits on the addition angle $\alpha$ obtained by the PI control unit 23. More specifically, the limiter 24 limits the addition angle $\alpha$ to a value within a range between a predetermined upper limit UL (positive value) and a predetermined lower limit LL (negative value). The upper limit UL and the lower limit LL are determined based on the maximum steering angular speed. The maximum steering angular speed is the maximum assumable value of the steering angular speed of the steering wheel 10, and, for example, approximately 800 deg/sec.

The rate of change in the electrical angle of the rotor 50 (angular speed in the electrical angle: maximum rotor angular speed) at the maximum steering angular speed is expressed by the product of the maximum steering angular speed, the speed reduction ratio of the speed reduction mechanism 7, and the number of pole pairs of the rotor 50, as indicated by Equation 2. The number of pole pairs is the number of magnetic pole pairs (pair of north pole and south pole) of the rotor 50.

$$\text{Maximum rotor angular speed} = \text{maximum steering angular speed} \times \text{speed reduction ratio} \times \text{number of pole pairs} \quad \text{Equation 2}$$

The maximum value of the amount of change in the electrical angle of the rotor 50 between the calculations (in the calculation cycle) of the control angle $\theta C$ is expressed by the value obtained by multiplying the maximum rotor angular speed by the calculation cycle, as indicated by Equation 3.

$$\text{Maximum value of amount of change in rotor angle} = \text{maximum rotor angular speed} \times \text{calculation cycle} = \text{maximum steering angular speed} \times \text{speed reduction ratio} \times \text{number of pole pairs} \times \text{calculation cycle} \quad \text{Equation 3}$$

This maximum value of the amount of change in the rotor angle is the maximum amount of change in the control angle $\theta C$ that is permitted within one calculation cycle. Therefore, if the maximum value of the amount of change in the rotor angle is expressed by $\omega\max$ (>0), the upper limit UL and the lower limit LL for the addition angle $\alpha$ are expressed by Equation 4 and Equation 5, respectively.

$$UL = +\omega\max \quad \text{Equation 4}$$

$$LL = -\omega\max \quad \text{Equation 5}$$

The limiter 24 compares the addition angle $\alpha$ obtained by the PI control unit 23 with the upper limit UL. If the addition angle $\alpha$ exceeds the upper limit UL, the limiter 24 substitutes the upper limit UL for the addition angle $\alpha$. Therefore, the upper limit UL (=+$\omega\max$) is added to the control angle $\theta C$. On the other hand, if the addition angle $\alpha$ obtained by the PI control unit 23 is smaller than the lower limit LL, the limiter 24 substitutes the lower limit LL for the addition angle $\alpha$. If the addition angle $\alpha$ obtained by the PI control unit 23 is equal to or larger than the lower limit LL and equal to or smaller than the upper limit UL, the addition angle $\alpha$ is added to the control angle $\theta C$ without modification.

Thus, the limiter 24 limits the addition angle $\alpha$ to a value within the range between the upper limit UL and the lower limit LL. Therefore, the control is executed stably. More specifically, if the unstable control state (state where an assist force is unstable) occurs when the electric current is insufficient or the control has just been started, it is possible to promptly shift the state from the unstable control state to the stable control state. Thus, it is possible to improve the steering feel.

The addition angle α obtained after the above-described limiting process is added to the immediately preceding value θC(n−1) (n is the number of the current calculation cycle) of the control angle θC by an addition unit 26A of the control angle calculation unit 26 ("Z−1" in the drawings indicates the immediately preceding value indicated by a signal). Note that, the initial value of the control angle θC is a predetermined value (e.g. 0).

The control angle calculation unit 26 includes the addition unit 26A that adds the addition angle α provided from the limiter 24 to the immediately preceding value θC(n−1) of the control angle θC. That is, the control angle calculation unit 26 calculates the control angle θC in each predetermined calculation cycle. The control angle calculation unit 26 uses the control angle θC in the immediately preceding calculation cycle as the immediately preceding value θC(n−1), and obtains the current value θC(n) that is the control angle θC in the current calculation cycle based on the immediately preceding value θC(n−1).

The command current value preparation unit 31 prepares, as command current values, values of electric currents that should be supplied to the coordinate axes (imaginary axes) of the γδ coordinate system, which is the imaginary rotating coordinate system that corresponds to the control angle θC that is a rotational angle used in the control. More specifically, the command current value preparation unit 31 prepares the γ-axis command current value Iγ* and the δ-axis command current value Iδ* (hereinafter, these values will be collectively referred to as "two-phase command current value Iγδ*" where appropriate). The command current value preparation unit 31 sets the γ-axis command current value Iγ* to a significant value, and sets the δ-axis command current value Iδ* to 0. More specifically, the command current value preparation unit 31 sets the γ-axis command current value Iγ* based on the detected steering torque T detected by the torque sensor 1.

Figure 6:
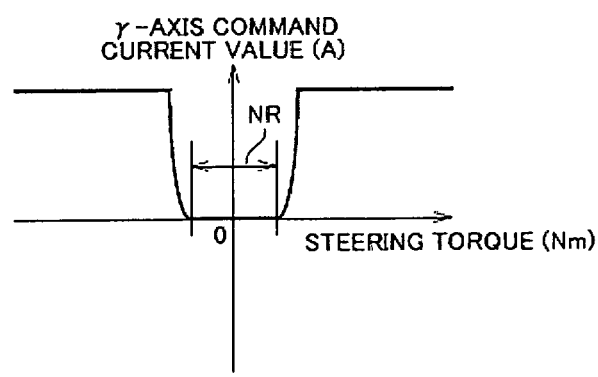
FIG. 6 is a graph showing an example of a manner for setting the γ-axis command current value with respect to the detected steering torque.

FIG. 6 shows an example of a manner of setting the γ-axis command current value Iγ* with respect to the detected steering torque T. The dead band NR is set in a region near the point at which the detected steering torque T is 0. The γ-axis command current value Iγ* rises sharply in the region outside the dead band NR, and is maintained substantially constant in the region where the torque is at or higher than a predetermined value. Thus, when the driver does not operate the steering wheel 10, electric power supply to the motor 3 is stopped to suppress unnecessary electric power consumption.

The current deviation calculation unit 32 calculates the deviation Iγ*−Iγ of the γ-axis detected current Iγ from the γ-axis command current value Iγ* prepared by the command current value preparation unit 31 and the deviation Iδ*−Iδ of the δ-axis detected current Iδ from the δ-axis command current value Iδ*(=0) prepared by the command current value preparation unit 31. The γ-axis detected current Iγ and the δ-axis detected current Iδ are provided from the UVW/γδ conversion unit 36 to the deviation calculation unit 32.

The UVW/γδ conversion unit 36 converts the three-phase detected current IUVW in the UVW coordinate system detected by the current detection unit 13 (the U-phase detected current IU, the V-phase detected current IV, and the W-phase detected current IW) to the two-phase detected currents Iγ and Iδ in the γδ coordinate system (hereinafter, collectively referred to as "two-phase detected current Iγδ" where appropriate). The two-phase detected currents Iγ and Iδ are provided to the current deviation calculation unit 32. The control angle θC calculated by the control angle calculation unit 26 is used in the coordinate conversion made by the UVW/γδ conversion unit 36.

The PI control unit 33 executes the IP calculation on the current deviation calculated by the current deviation calculation unit 32 to prepare the two-phase command voltage Vγδ* (the γ-axis command voltage Vγ* and the δ-axis command voltage Vδ*) that should be applied to the motor 3. The two-phase command voltage Vγδ* is provided to the γδ/UVW conversion unit 34.

The γδ/UVW conversion unit 34 executes the coordinate conversion calculation on the two-phase command voltage Vγδ* to prepare the three-phase command voltage VUVW*. The three-phase command voltage VUVW* is formed of the U-phase command voltage VU*, the V-phase command voltage VV* and the W-phase command voltage VW*. The three-phase command voltage VUVW* is provided to the PWM control unit 35. The control angle θC calculated by the control angle calculation unit 26 is used in the coordinate conversion made by the γδ/UVW conversion unit 34.

The PWM control unit 35 prepares the U-phase PWM control signal, the V-phase PWM control signal and the W-phase PWM control signal having duty ratios that correspond to the U-phase command voltage VU*, the V-phase command voltage VV* and the W-phase command voltage VW*, respectively, and provides the control signals to the drive circuit 12.

The drive circuit 12 is formed of an inverter circuit having three phases that correspond to the U-phase, the V-phase and the W-phase. The power elements that constitute the inverter circuit are controlled based on the PWM control signals provided from the PWM control unit 35, and therefore the voltages that correspond to the three-phase command voltage VUVW* are applied to the U-phase stator coil 51, the V-phase stator coil 52 and the W-phase stator coil 53 of the motor 3.

The current deviation calculation unit 32 and the PI control unit 33 constitute a current feedback control unit. The current feedback control unit controls the electric current that is supplied to the motor 3 in such a manner that the electric current that is supplied to the motor 3 approaches the two-phase command current value Iγδ* that is set by the command current value preparation unit 31.

The rotation angular speed estimation unit 27 estimates the rotation angular speed of the motor 3 based on the current (detected current Iγδ) supplied to the motor 3 and the voltage (command voltage Vγδ*) applied to the motor 3. More specifically, the rotation angular speed estimation unit 27 estimates the induced voltage generated by the motor 3 based on the detected current and the applied voltage with the use of the resistance value and the inductance of the motor 3, and estimates the motor rotation angular speed based on the induced voltage.

Figure 3:
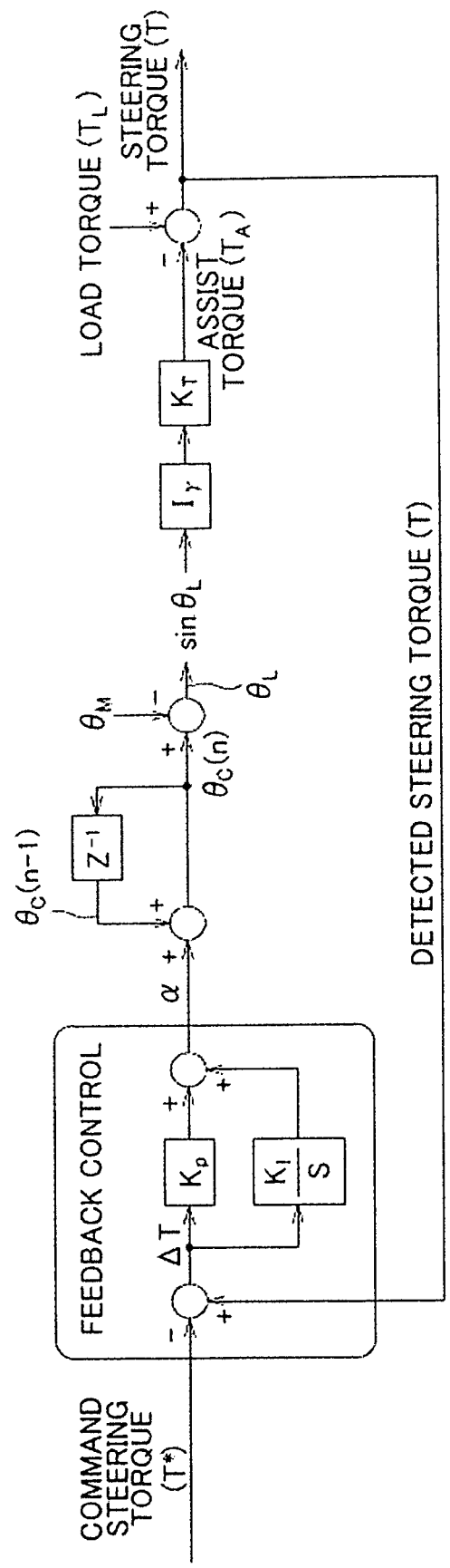
FIG. 3 is a control block diagram of the electric power steering apparatus.

FIG. 3 is a control block diagram of the electric power steering apparatus. Note that the function of the limiter 24 is omitted to simplify the explanation.

Through the PI control (KP is a proportionality coefficient, KI is an integration coefficient, and 1/s is an integration operator) on the deviation (torque deviation) of the detected steering torque T from the command steering torque T*, the addition angle α is prepared. The current value θC(n)=θC(n−1)+α of the control angle θC is obtained by adding the addition angle α to the immediately preceding value θC(n−1) of the control angle θC. At this time, the deviation of the actual rotor angle θM of the rotor 50 from the control angle θC is used as the load angle θL=θC−θM.

Therefore, if the γ-axis current Iγ is supplied to the γ-axis (imaginary axis) in the γδ coordinate system (imaginary rotating coordinate system), which rotates in accordance with the control angle θC, based on the γ-axis command current value Iγ*, the q-axis current Iq is equal to Iγ sin θL (Iq=Iγ sin θL).

The q-axis current Iq contributes to generation of torque by the rotor 50. That is, the value obtained by multiplying the q-axis current Iq (=Iγ sin θL) by the torque constant KT of the motor 3 is transmitted to the steering mechanism 2 via the speed reduction mechanism 7 as the assist torque TA (=KT×Iγ sin θL). The value obtained by subtracting the assist torque TA from the load torque TL from the steering mechanism 2 is the steering torque T that should be applied by the driver to the steering wheel 10. When the steering torque T is fed back, a system is operated in such a manner that the steering torque T is brought to the command steering torque T* (the value obtained after a correction made by the command steering torque correction unit 21A). That is, the addition angle α is obtained and the control angle θC is controlled based on the addition angle α so that the detected steering torque T coincides with the command steering torque T*.

The control angle θC is updated with the use of the addition angle α that is obtained based on the deviation ΔT of the detected steering torque T from the command steering torque T* while an electric current is supplied to the γ-axis that is the imaginary axis used in the control. Thus, the load angle θL changes and therefore, the torque that corresponds to the load angle θL is generated by the motor 3. Therefore, the torque that corresponds to the command steering torque T* set based on the steering angle and the vehicle speed is generated by the motor 3. Therefore, an appropriate steering assist force that corresponds to the steering angle and the vehicle speed is applied to the steering mechanism 2. That is, the steering assist control is executed in such a manner that the steering torque increases as the absolute value of the steering angle increases and the steering torque decreases as the vehicle speed increases.

Therefore, there is provided the electric power steering apparatus in which an appropriate steering assist operation is executed by appropriately controlling the motor 3 without using a rotational angle sensor. Thus, the configuration is simplified and cost is reduced.

FIG. 7 is a flowchart illustrating the routine executed by the command steering torque setting unit 21. The absolute value |α| of the addition angle α obtained by the PI control unit 23 is compared with the predetermined threshold A (A>0) (step (hereinafter, referred to as "S") 1). The threshold A may be set based on the convergence that is required when the steering wheel 10 is returned to the steering angle neutral point while the driver takes hands off the steering wheel 10. For example, the threshold A is set to a value that corresponds to the steering speed of 200 deg/sec. More specifically, the threshold A is the value obtained by converting the steering speed into the electrical angle of the motor 3, that is, the value obtained by multiplying the steering speed (200 deg/sec) by the speed reduction ratio of the speed reduction mechanism 7 and the number of pole pairs of the rotor 50.

If the absolute value |α| of the addition angle α is equal to or larger than the threshold A, the imaginary rotating coordinate system γδ rotates at a high speed and the amount of change in the control angle θC is large, that is, the rotation angular speed of the motor 3 is high. On the other hand, if the absolute value |α| of the addition angle α is smaller than the threshold A, the amount of change in the control angle θC is small and the rotation angular speed of the motor 3 is low. Therefore, if the absolute value |α| of the addition angle α is smaller than the threshold A ("NO" in S1), the command steering torque T* that corresponds to the steering angle is obtained based on the normal characteristic shown in FIG. 4A (S2). On the other hand, if the absolute value |α| of the addition angle α is equal to or larger than the threshold A ("YES" in S1), the command steering torque T* that corresponds to the steering angle is obtained based on the damping characteristic shown in FIG. 4B (S3).

According to the first embodiment described above, if the absolute value |α| of the addition angle α is equal to or larger than the threshold A, the damping characteristic shown in FIG. 4B is applied. Therefore, the steering angle and the command steering torque are opposite in sign when the steering angle is within the predetermined steering angle region near the steering angle neutral point. Thus, the command steering torque T* is set in such a manner that when the steering wheel 10 attempts to return to the steering angle neutral point at a high speed (at or higher than 200 deg/sec), a change in the steering angle is hindered. As a result, the convergence is improved, and a good steering feel is obtained.

Note that, the characteristic of the command steering torque T* need not be changed based on the degree of the absolute value |α| of the addition angle α, and the damping characteristic shown in FIG. 4B may be applied independently of the addition angle α. In this case as well, the convergence when the steering angle is near the steering angle neutral point is improved, and the command steering torque T* is set based on the steering angle.

Figure 8:
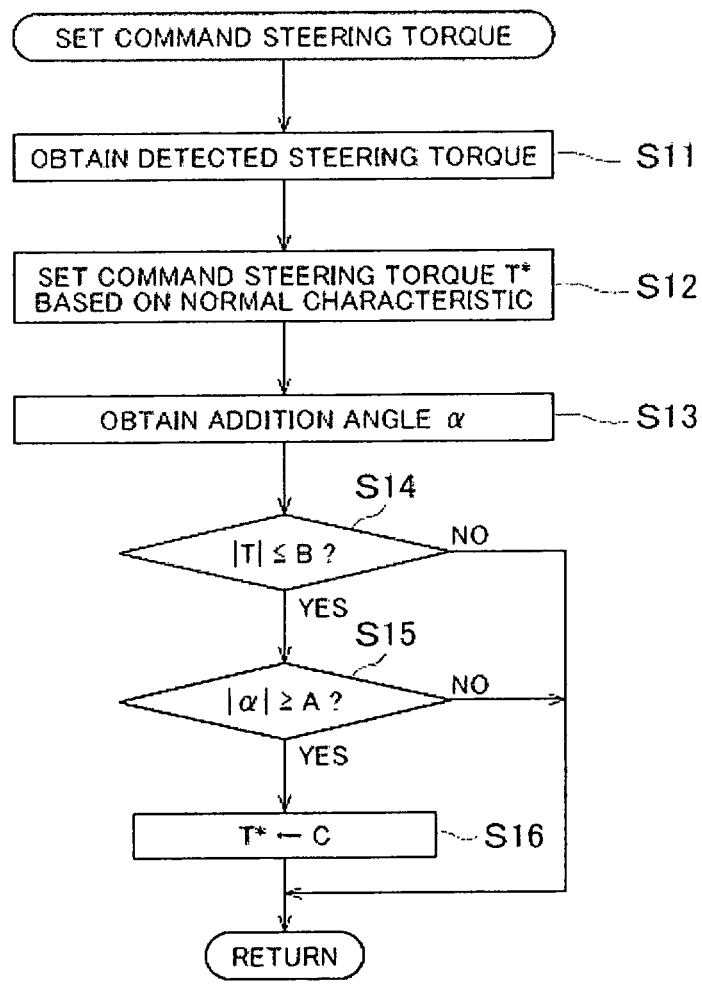
FIG. 8 is a flowchart illustrating the routine executed by an electric power steering apparatus (vehicle steering apparatus) according to a second embodiment of the invention.

FIG. 8 is a flowchart illustrating the routine of an electric power steering apparatus (vehicle steering apparatus) according to a second embodiment of the invention. FIGS. 1 to 6 are used again in the description of the second embodiment. FIG. 8 shows the routine executed by the command steering torque setting unit 21 to set the command steering torque T*.

In the second embodiment, the damping characteristic shown in FIG. 4B is not used, and only the normal characteristic shown in 4A is used. The command steering torque setting unit 21 sets the command steering torque T* that corresponds to the steering angle based on the normal characteristic shown in FIG. 4A. As indicated by a dashed-two dotted line 21a in FIG. 1, the steering torque detected by the torque sensor 1 is provided to the command steering torque setting unit 21. The command steering torque setting unit 21 determines whether the driver takes hands off the steering wheel 10 based on the detected steering torque T. If it is determined that the driver takes hands off the steering wheel 10, when the amount of change in the control angle θC is equal to or larger than the predetermined value, the command steering torque setting unit 21 sets the command steering torque T* in such a manner that a change in the steering angle is suppressed. In this case, the command steering torque T* may be 0, or a value that is opposite in sign to the detected steering torque T. Thus, when the driver takes hands off the steering wheel 10, if the steering wheel 10 attempts to return to the steering angle neutral point by the reaction force from the road surface, a change in the steering angle is suppressed. Therefore, the damping control is realized. As a result, the convergence is improved.

More specifically, as shown in FIG. 8, the command steering torque setting unit 21 obtains the detected steering torque T (S11), and calculates the command steering torque T* that corresponds to the steering angle based on the normal characteristic shown in FIG. 4A (S12). In addition, the command steering torque setting unit 21 obtains the addition angle α calculated by the PI control unit 23 (S13). Then, the command steering torque setting unit 21 determines whether the absolute value |T| of the detected steering torque is equal to or lower than the predetermined torque threshold B (e.g. 1 Nm) (S14). The torque threshold B is set based on, for example, the preload placed on the system (load placed on the system in the state where an external force is not applied).

If it is determined that the absolute value |T| of the detected steering torque exceeds the torque threshold B ("NO" in S14), the command steering torque T* set based on the normal characteristic shown in FIG. 4A is used. On the other hand, if it is determined that the absolute value |T| of the detected steering torque is equal to or lower than the torque threshold B ("YES" in S14), the command steering torque setting unit 21 compares the absolute value |α| of the addition angle α with the predetermined threshold A (S15). The threshold A may be determined in the same manner as that in the first embodiment.

If it is determined that the absolute value |α| of the addition angle α is smaller than the threshold A ("NO" in S15), the command steering torque setting unit 21 uses the command steering torque T* that corresponds to the steering angle. On the other hand, if it is determined that the absolute value |α| of the addition angle α is equal to or larger than the threshold A ("YES" in S15), the command steering torque setting unit 21 sets the command steering torque T* to the predetermined constant value C (S16).

The constant value C may be, for example, 0 Nm. The constant value C may be a constant that is opposite in sign to the detected steering torque T. That is, when the detected steering torque T is equal to or higher than 0, the constant value C is set to −D (D is a positive constant). When the detected steering torque T is lower than 0, the constant value C may be set to D. The constant D may be set based on a desired speed at which the steering wheel 10 is returned to the steering angle neutral point. For example, D may be set to 1.

When the absolute value |T| of the detected steering torque is low and the absolute value |α| of the addition angle α is large, it is considered that the steering angle is changing at a high speed in the state where the driver takes hands off the steering wheel 10. In such a case, the command steering torque T* is set to a constant value in the second embodiment. Thus, the motor 3 generates a torque in such a manner that an abrupt change in the steering angle is suppressed. Therefore, it is possible to improve the convergence when the steering wheel 10 is returned to the steering angle neutral point.

Figure 9:
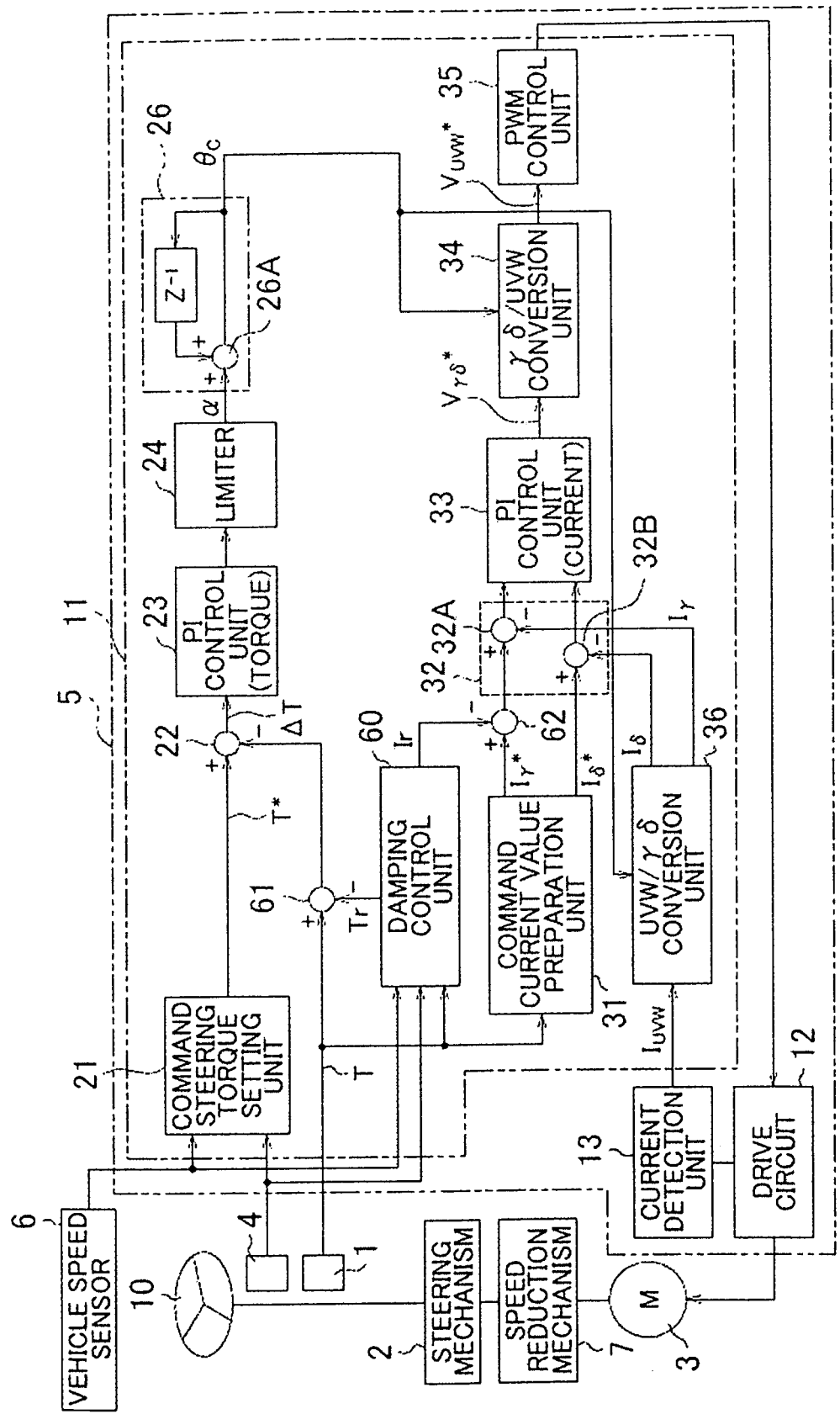
FIG. 9 is a block diagram illustrating the configuration of an electric power steering apparatus (vehicle steering apparatus) according to a third embodiment of the invention.

FIG. 9 is a block diagram illustrating the configuration of an electric power steering apparatus (vehicle steering apparatus) according to a third embodiment of the invention. In FIG. 9, the same reference numerals are assigned to the same portions as those in FIG. 1.

In the third embodiment, a damping control unit 60 that prepares the detected torque correction value Tr for the detected steering torque T, and the command current correction value Ir for the γ-axis command current value Iγ* is provided to realize the damping control. The detected torque correction value Tr is subtracted from the detected steering torque T by a detected torque correction unit 61. The detected steering torque T after correction is provided to the torque deviation calculation unit 22. The command current correction value Ir is subtracted from the γ-axis command current value Iγ* by the γ-axis command current correction unit 62. The γ-axis command current value Iγ* after correction is provided to the current deviation calculation unit 32. More specifically, the current deviation calculation unit 32 includes a γ-axis current deviation calculation unit 32A and a δ-axis current deviation calculation unit 32B. The γ-axis current deviation calculation unit 32A obtains the deviation Iγ*−Iγ of the γ-axis detected current Iγ from the γ-axis command current value Iγ* (after correction) from the γ-axis command current correction unit 62, and provides the deviation to the PI control unit 33. The δ-axis current deviation calculation unit 32B obtains the deviation Iδ*−Iδ of the δ-axis detected current Iδ from the δ-axis command current value Iδ* prepared by the command current value preparation unit 31, and provides the deviation to the PI control unit 33.

When the condition for executing the damping control is satisfied, the damping control unit 60 and the detected torque correction unit 61 operate in such a manner that the absolute value of the steering torque T detected by the torque sensor 1 temporarily is decreased. Thus, the torque deviation ΔT increases, and the addition angle α calculated by the PI control unit 23 decreases. As a result, the assist torque decreases. That is, the torque feedback control unit formed of the torque deviation calculation unit 22 and the PI control unit 23 operates in such a manner that the absolute value of the detected steering torque T is temporarily larger than the absolute value of the command steering torque T*. As a result, the assist torque generated by the motor 3 temporarily decreases. Therefore, a change in the steering angle is suppressed, and the damping control is realized.

When the condition for executing the damping control is satisfied, the damping control unit 60 and the γ-axis command current correction unit 62 operate in such a manner that the absolute value of the γ-axis command current value Iγ* is temporarily decreased. Thus, the current feedback control unit formed of the γ-axis current deviation calculation unit 32A and the PI control unit 33 operates in such a manner that the absolute value of the γ-axis current Iγ is temporarily decreased. Thus, the torque generated by the motor 3 decreases, and the steering assist force is decreased. As a result, a change in the steering angle is suppressed, and the damping control is realized.

If the detected steering torque T is corrected, the damping control is realized. Therefore, a correction to the γ-axis command current value Iγ* need not be made. However, if the absolute value of the γ-axis command current value Iγ* is decreased, energy conservation is improved.

However, if only a decrease in the absolute value of the γ-axis command current value Iγ* is made, it is not possible to realize the damping control. This is because the torque feedback control unit (the torque deviation calculation unit 22 and the PI control unit 23) operates in such a manner that a decrease in the absolute value of the γ-axis command current value Iγ* is compensated for and the control angle θC is set in such a manner that the command steering torque T* is achieved.

Figure 10A:
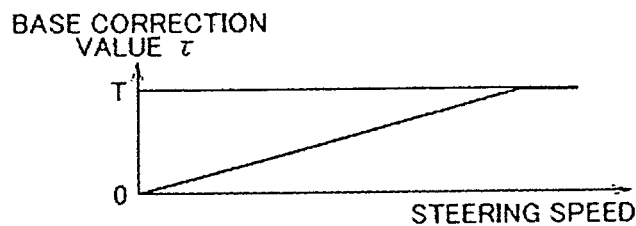
FIGS. 10A to 10D are graphs each illustrating the characteristic of the detected torque correction value used as the damping correction value.
Figure 10B:
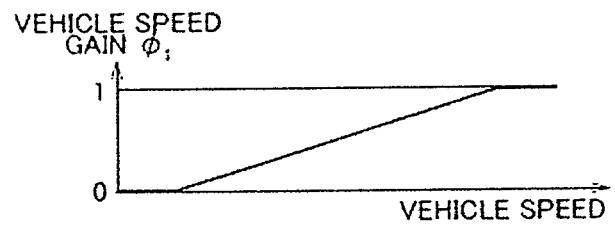
Figure 10C:
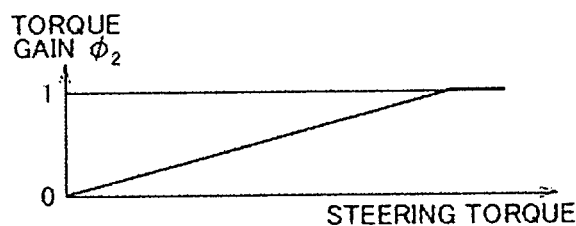
Figure 10D:
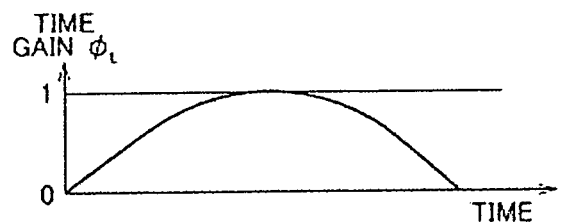

FIGS. 10A to 10D are graphs illustrating the characteristic of the detected torque correction value Tr used as the damping correction value. FIG. 10A shows the characteristic of the base correction value τ with respect to the steering speed. FIG. 10B shows the gain (vehicle speed gain) $\phi_1$ of the detected torque correction value with respect to the vehicle speed. FIG. 10C shows the gain (torque gain) $\phi_2$ of the detected torque correction value with respect to the steering torque. FIG. 10D shows the gain (time gain) $\phi_t$ of the detected torque correction value with respect to the elapsed time.

The base correction value τ is set so as to monotonously increase as the absolute value of the steering speed increases, as shown in FIG. 10A. The upper limit is set to the detected steering torque T. The damping control unit 60 obtains the steering speed by executing temporal differentiation on the steering speed detected by the steering angle sensor 4, and sets the base correction value τ that corresponds to the steering speed based on the characteristic shown in FIG. 10A.

The vehicle speed gain $\phi_1$ is set to have a characteristic according to which the vehicle speed gain $\phi_1$ is maintained at 0 until the vehicle speed reaches a predetermined speed, and monotonously increases as the vehicle speed increases after the vehicle speed exceeds the predetermined speed, as shown in FIG. 10B. The damping control unit 60 sets the vehicle speed gain $\phi_1$ that corresponds to the vehicle speed detected by the vehicle speed sensor 6 based on the characteristic shown in FIG. 10B.

The torque gain $\phi_2$ is set to have a characteristic according to which the torque gain $\phi_2$ monotonously increases as the absolute value of the detected steering torque T increases, as shown in FIG. 10C. The damping control unit 60 sets the torque gain $\phi_2$ that corresponds to the absolute value of the steering torque T detected by the torque sensor 1 based on the characteristic shown in FIG. 10C.

The time gain $\phi_t$ increases from 0 to the maximum value and then decreases to 0, as shown in FIG. 10D. The damping control unit 60 sets the time gain $\phi_t$ that corresponds to the time that has elapsed after the damping control is started based on the characteristic shown in FIG. 10D.

The detected torque correction value Tr is calculated by Equations 6 and 7. Note that, Tm indicates the detected torque maximum correction value (maximum value of the detected torque correction value Tr), and indicates the detected torque correction value Tr ($\phi_t=1$) when the time gain $\phi_t$ is equal to 1. When the detected steering torque T is a positive value, the value expressed by Equation 7 is used without modification. When the detected steering torque T is a negative value, the value obtained by assigning a negative sign to the value expressed by Equation 7 is used as the detected torque correction value Tr.

$$Tm = T \times \phi_1 \times \phi_2 \qquad \text{Equation 6}$$

$$Tr = Tm \times \phi_t \qquad \text{Equation 7}$$

The torque of the motor 3 and the γ-axis current are substantially proportional to each other. Therefore, the command current correction value Ir is calculated based on the detected torque correction value Tr. The pattern of the temporal change in the command current correction value Ir is the same as the pattern of the temporal change in the detected torque correction value Tr. More specifically, the command current correction value Ir for the γ-axis command current value Iγ* is obtained by, for example, Equation 8.

$$Ir = Tr/\text{torque constant} \qquad \text{Equation 8}$$

The damping control unit 60 calculates the detected torque maximum correction value Tm. If the detected torque maximum correction value Tm is 0, the damping control unit 60 determines that the damping control is not required and sets the detected torque maximum correction value Tr to 0. On the other hand, if the detected torque maximum correction value Tm is not 0, the damping control unit 60 determines that the damping control is required and starts the damping control, and prepares the detected torque correction value Tr and the command current correction value Ir according to Equation 7 and Equation 8, respectively.

The damping correction values (the detected torque correction value Tr and the command current correction value Ir) vary depending on time. Therefore, as shown in FIG. 11, the damping correction values that are calculated at different times may overlap with each other. In this case, the damping correction value may be determined in the following manner.

(i) The detected torque maximum correction values Tm(n) that are determined at sampling times are stored.

(ii) The detected torque correction values Tr(t, Tm(n)) produced at time t by the detected torque maximum correction values Tm(n) are calculated.

(iii) The maximum value among the detected torque correction values Tr(t, Tm(n)) at time t is calculated, and used as the detected torque correction value Tr(t) at time t.

According to this method, the maximum value among the detected torque correction values indicated by the solid lines is selected at each sampling time, as shown in FIG. 11.

In order to execute this process, the capacity of the memory should be large enough to store a large number of detected torque correction value curves, and the amount of calculation is also large. Therefore, between the process (i) and the process (ii), there should be provided a process in which the detected torque maximum correction value Tm used to calculate the detected torque correction value Tr(n) at the immediately preceding sampling time is discarded. Thus, although it is not always possible to select the maximum value among the detected torque maximum correction values Tm, the damping characteristic is obtained without problems, and the amount of calculation decreases.

According to the third embodiment described above, it is possible to temporarily execute the damping control when necessary (when Tm≠0) based on the detected torque maximum correction value Tm that is determined based on the steering speed, the vehicle speed and the detected steering torque. Thus, a response to a steering operation is improved, and the convergence when the steering wheel 10 is returned to the steering angle neutral point in the state where the driver takes hands off the steering wheel 10 is improved.

In addition, the damping control is realized by correcting the detected steering torque T. Therefore, the influence on a torque control system (torque deviation calculation unit 22, the PI control unit 23, the limiter 24, and the control angle calculation unit 26) is small. Accordingly, it is possible to use the torque control system used when the damping control is not executed without redesign.

It is possible to realize the damping control by making a temporary correction to the command steering torque T* instead of correcting the detected steering torque T. In this case, because the influence on the torque control system cannot be ignored, preferably, the control system should be redesigned.

Figure 12:
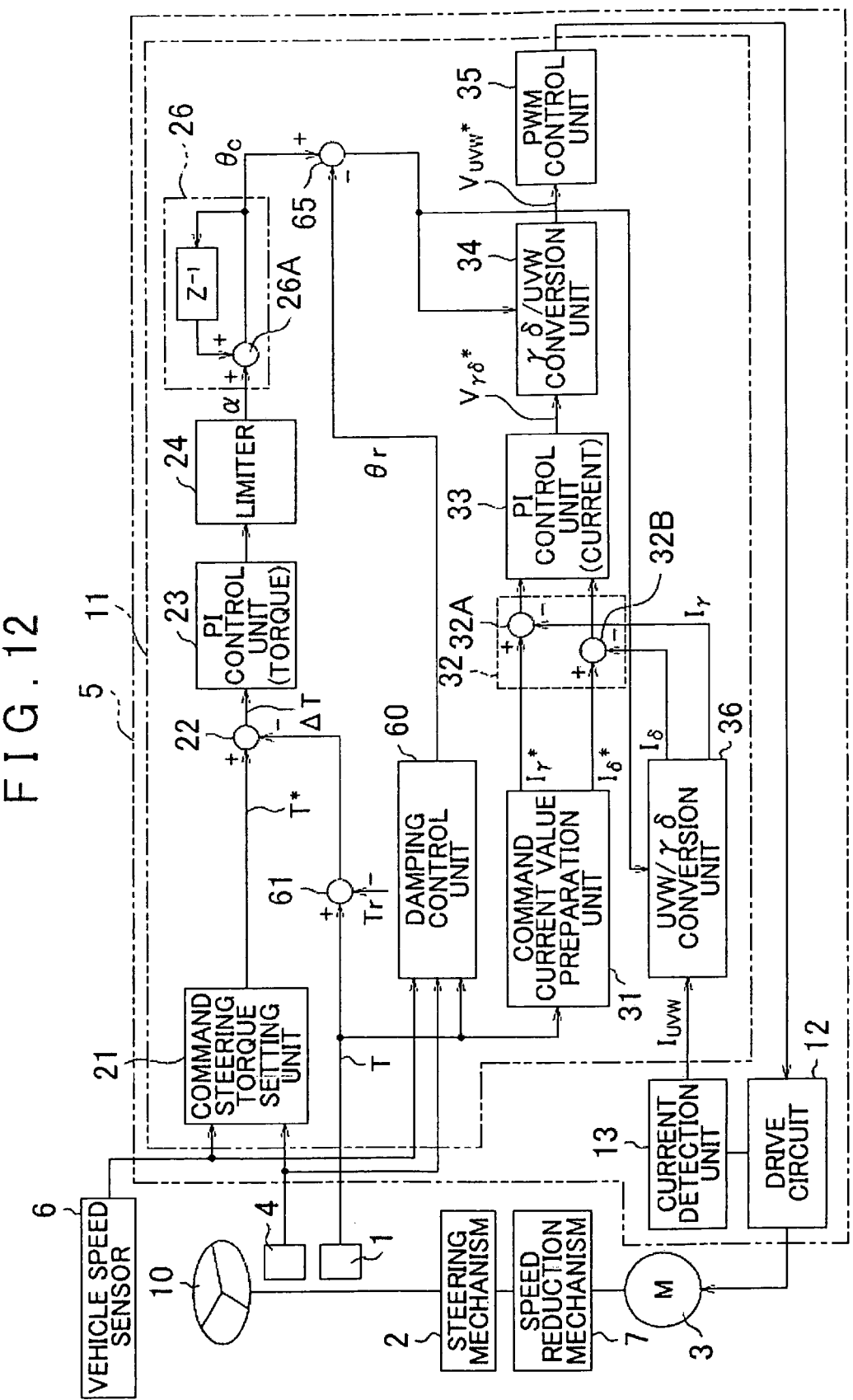
FIG. 12 is a block diagram illustrating the configuration of an electric power steering apparatus (vehicle steering apparatus) according to a fourth embodiment of the invention.

FIG. 12 is a block diagram illustrating the configuration of an electric power steering apparatus (vehicle steering apparatus) according to a fourth embodiment of the invention. In FIG. 12, the same reference numerals are assigned to the same elements as those in FIG. 9. In the third embodiment described above, the damping control unit 60 realizes the damping control by correcting the detected steering torque T and the γ-axis command current value Iγ*. However, in the fourth embodiment, the damping control unit 60 executes the damping control by correcting the detected steering torque T and the control angle θC.

That is, the damping control unit 60 prepares the detected torque correction value Tr and the control angle correction value θr based on the vehicle speed, the detected steering torque T and the steering angle. The detected torque correction value Tr is subtracted from the detected steering torque T by the detected torque correction unit 61. The control angle correction value θr is subtracted from the control angle θC prepared by the control angle calculation unit 26 by the control angle correction unit 65.

The damping control unit 60 and the detected torque correction unit 61 operate in such a manner that the absolute value of the steering torque T detected by the torque sensor 1 is temporarily decreased when the condition for executing the damping control is satisfied. The damping control unit 60 and the control angle correction unit 65 operate in such a manner that the control angle θC is temporarily decreased when the condition for executing the damping control is satisfied. Because the q-axis current Iq is decreased by a decrease in the control angle θC, the torque generated by the motor 3 (assist torque) decreases. Thus, the damping control is realized.

With a decrease in the assist torque, the absolute value of the detected steering torque T increases. In this case, the detected steering torque T is corrected in such a manner that the absolute value thereof decreases. Thus, the torque control system that includes the deviation calculation unit 22, the PI control unit 23, the limiter 24 and the control angle calculation unit 26 is allowed to operate independently of the damping control, and special calculation for realizing the damping control is not required. Accordingly, redesign of the configuration (torque control system) for calculating the control angle may be omitted.

The detected torque correction value Tr is determined in the same manner as that in the third embodiment described above. The control angle correction value θr is obtained by Equation 9.

$$\theta r = |Tr|/\text{constant} \qquad \text{Equation 9}$$

Overlap among the detected torque correction values Tr is the same as that in the third embodiment described above.

In the fourth embodiment as well as in the third embodiment, it is possible to execute the damping control when necessary (when Tm≠0) based on the steering speed, the vehicle speed and the detected steering torque. Thus, it is possible to improve a response to a steering operation, and improve the convergence when the driver takes hands off the steering wheel 10.

In the fourth embodiment as well, it is possible to realize the damping control by making a temporary correction to the command steering torque T* instead of correcting the detected steering torque T. However, in this case, the influence on the torque control system cannot be ignored. Therefore, preferably, the torque control system should be redesigned.

Figure 13:
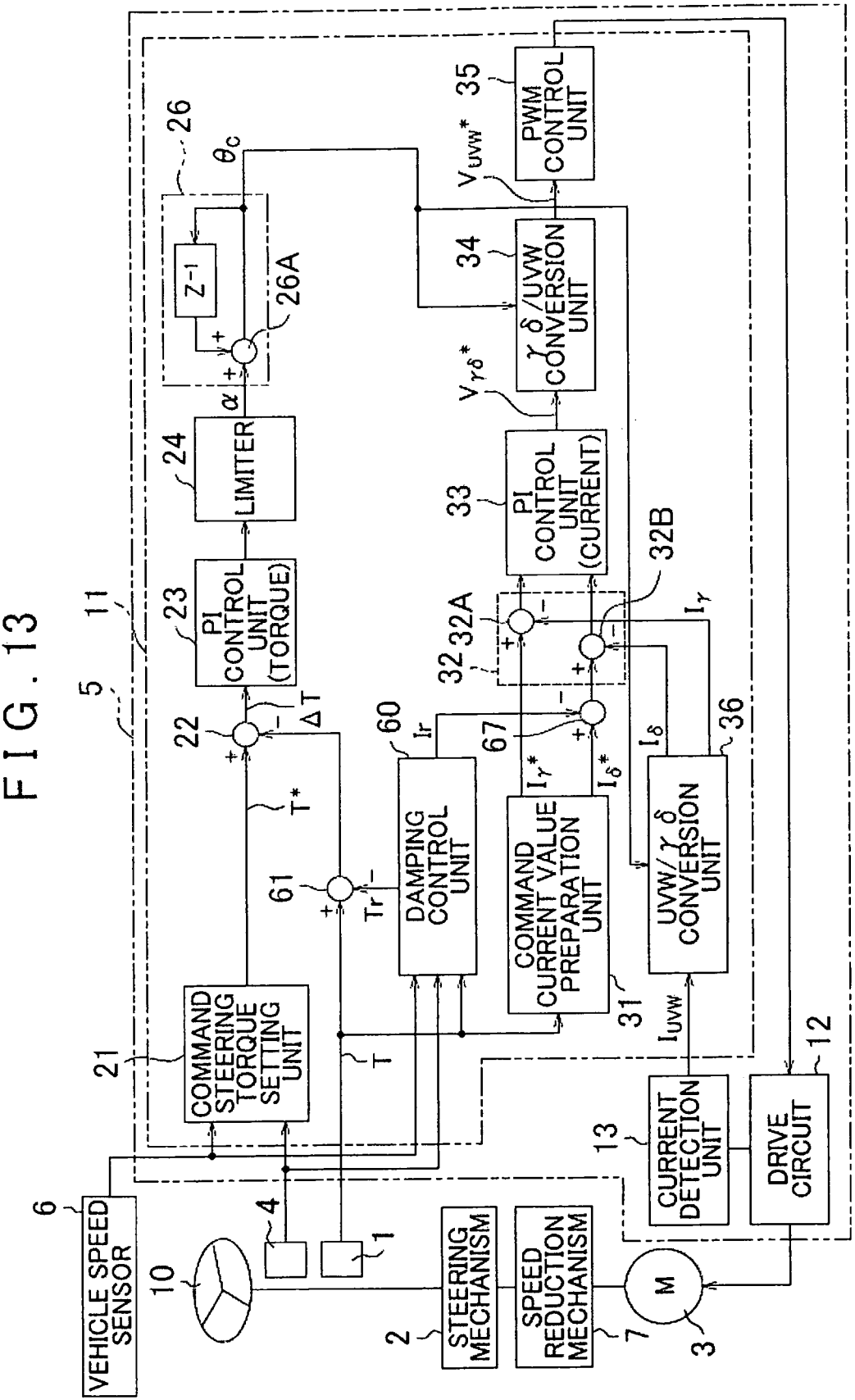
FIG. 13 is a block diagram illustrating the configuration of an electric power steering apparatus (vehicle steering apparatus) according to a fifth embodiment of the invention.

FIG. 13 is a block diagram illustrating the configuration of an electric power steering apparatus (vehicle steering apparatus) according to a fifth embodiment of the invention. The same reference numerals are assigned to the same portions as those in FIG. 9. In the third embodiment, the damping control is realized by correcting the γ-axis command current value Iγ* in addition to the detected steering torque T. In contrast, in the fifth embodiment, the damping control is realized by correcting the δ-axis command current value Iδ* in addition to the detected steering torque T.

As is clear from FIG. 2, the torque generated by the motor 3 may fluctuate even when the γ-axis command current value Iγ* is maintained and the δ-axis command current value Iδ* is changed. Therefore, in the fifth embodiment, the damping control is executed by correcting the δ-axis command current value Iδ* without changing a current control system related to the γ-axis command current value Iγ*.

More specifically, the damping control unit 60 prepares the current correction value Ir used to correct the δ-axis command current value Iδ* in addition to preparing the detected torque correction value Tr. The current correction value Ir is subtracted from the δ-axis command current value Iδ* by the δ-axis command current correction unit 67. In this case, when the load angle θL (see FIG. 2) is a positive value, the positive sign is assigned to the current correction value Ir. On the other hand, when the load angle θL is a negative value, the negative sign is assigned to the current correction value Ir. Therefore, when the load angle θL is a positive value, if the δ-axis command current value Iδ* is 0, the δ-axis command current value Iδ* after correction is a negative value. The deviation Iδ*−Iδ of the δ-axis detected current value Iδ from the δ-axis command current value Iδ* after the above-described correction is provided to the PI control unit 33.

The current correction value Ir is obtained with the use of the detected torque correction value Tr by the equation, Ir=Tr/constant.

When the condition for executing the damping control is satisfied, more specifically, when the detected torque maximum correction value Tm is not 0, the damping control unit 60 and the detected torque correction unit 61 operate in such a manner that the absolute value of the steering torque T detected by the torque sensor 1 is temporarily decreased. Thus, the torque deviation ΔT increases. Therefore, the addition angle α calculated by the PI control unit 23 decreases with an increase in the torque deviation ΔT. As a result, the assist torque that is generated by the motor 3 decreases. That is, the torque feedback control unit formed of the torque deviation calculation unit 22 and the PI control unit 23 operates in such a manner that the absolute value of the detected steering torque T is temporarily higher than the absolute value of the command steering torque T*. As a result, the assist torque decreases. Therefore, a change in the steering angle is suppressed, and the damping control is realized.

When the condition for executing the damping control is satisfied, the damping control unit 60 and the δ-axis command current correction unit 67 operate in such a manner that a temporary correction is made to the δ-axis command current value Iδ*. More specifically, when the load angle θL is a positive value, the δ-axis command current value Iδ* is decreased. When the load angle θL is a negative value, the δ-axis command current value Iδ* is increased. Thus, the current feedback control unit formed of the δ-axis current deviation calculation unit 32B and the PI control unit 33 operates in such a manner that the δ-axis current Iδ is temporarily changed (decreased or increased). Thus, the absolute value of the q-axis current Iq (=Iγ×sin θL+Iδ cos θL) decreases. As a result, the torque generated by the motor 3 decreases. Accordingly, the steering assist force decreases, and the steering load increases with a decrease in the steering assist force. Thus, a change in the steering angle is suppressed. Accordingly, the damping control is realized. Whether the load angle θL is a positive value or a negative value is determined based on the sign of the command steering torque T*, the detected steering torque T or the steering angle. That is, if the sign of the command steering torque T* (the detected steering torque T or the steering angle) is the positive sign, it is determined that the sign of the load angle θL is the positive sign. On the other hand, if the sign of the command steering torque T* (the detected steering torque T or the steering angle) is the negative sign, it is determined that the sign of the load angle θL is the negative sign.

According to the fifth embodiment, it is possible to realize the damping control without exerting a significant influence on the torque control system and the γ-axis current control system.

In the fifth embodiment as well, it is possible to realize the damping control by making a temporary correction to the command steering torque T* instead of correcting the detected steering torque T. In this case, as described above, the influence on the torque control system cannot be ignored. Therefore, preferably, the torque control system should be redesigned.

According to the embodiments described above, the motor is driven based on the axis current value (hereinafter, referred to as "imaginary axis current value") in the rotating coordinate system (γδ coordinate system: referred to as "imaginary rotating coordinate system", and the coordinate axis of the imaginary rotating coordinate system is referred to as "imaginary axis") that rotates in accordance with the control angle. The control angle is updated by adding the addition angle to the immediately preceding value of the control angle in each control cycle. Thus, it is possible to generate a required torque by driving the motor based on the imaginary axis current value while updating the control angle, that is, updating the coordinate axis (imaginary axis) in the imaginary rotating coordinate system. Thus, it is possible to generate an appropriate torque with the use of the motor without using a rotational angle sensor.

In addition, according to the embodiments, the steering torque that is applied to the operation member is detected while the command steering torque is set based on the steering angle of the steering mechanism. Then, the addition angle is calculated based on the deviation of the detected steering torque from the command steering torque. Thus, the addition angle is set in such a manner that the detected steering torque is brought to the command steering torque, and the control angle is set based on the addition angle. Therefore, it is possible to generate an appropriate driving force with the use of the motor so that the detected steering torque corresponds to the steering angle, and provide the appropriate driving force to the steering mechanism. That is, the deviation (load angle) of the imaginary axis from the coordinate axis in the rotating coordinate system (dq coordinate system) that extends in the direction of the magnetic pole of the rotor is brought to a value that corresponds to the command steering torque. As a result, it is possible to generate an appropriate torque with the use of the motor, and provide a driving force that reflects a driver's intention to steer the vehicle to the steering mechanism. In addition, when the predetermined condition is satisfied, the addition angle is changed so that the characteristic of calculating the control angle is changed. As a result, such control provides the steering apparatus with a good feeling.

The embodiments of the invention have been described above. However, the invention may be implemented in other embodiments. For example, in the embodiments described above, the configuration in which a rotational angle sensor is not provided and the motor 3 is driven by executing the sensorless control has been described. Alternatively, the configuration in which a rotational angle sensor, for example, a resolver is provided and the above-described sensorless control is executed when the rotational angle sensor malfunctions may be employed. Thus, even if the rotational angle sensor malfunctions, the motor 3 is continuously driven. Therefore, the steering assist operation is continuously executed.

In this case, when the rotational angle sensor is used, the δ-axis command current value Iδ* is generated by the command current value preparation unit 31 based on the steering torque and the vehicle speed according to the predetermined assist characteristic.

In the control in which a signal output from the rotational angle sensor is used, it is not necessary to use the control angle θC because the rotor angle θM is obtained, and it is not necessary to use the imaginary rotating coordinate system that rotates in accordance with the control angle θC. That is, the motor 3 is driven by controlling the d-axis current and the q-axis current. However, if both a γδ current control unit that executes a current control based on the γδ-axis and a dq current control unit that executes a current control based on the dq axis are provided, a large region of the memory (ROM) of the microcomputer 11, which stores programs, is used. Therefore, preferably, the γδ current control unit and the dq current control unit should be integrated by sharing the angular variable. More specifically, when the rotational angle sensor operates properly, the angular variable used by the integrated current control unit is used as the angle for the dq coordinate system. When the rotational angle sensor malfunctions, the angular variable used by the integrated current control unit is used as angle for the γδ coordinate system. Thus, the amount of memory used is suppressed. Accordingly, the memory capacity is reduced and cost is reduced.

In the embodiments described above, the invention is applied to the electric power steering apparatus. Alternatively, the invention may be applied to a motor control for an electric pump hydraulic power steering apparatus. Further alternatively, the invention may be implemented in various embodiments other than a power steering apparatus. For example, the invention may be applied to a steer-by-wire (SBW) system, a variable gear ratio (VGR) steering system, and a control over a brushless motor provided in another vehicle steering apparatus.

Further, various design changes may be made within the scope of the invention defined by claims.

What is claimed is:

1. A vehicle steering apparatus, comprising:
a motor that includes a rotor and a stator that faces the rotor;
a motor control unit that controls the motor without requiring an input from a rotational angle sensor;
a steering mechanism for a vehicle, to which a driving force is supplied by the motor;
a current drive unit that drives the motor based on an axis current value in a rotating coordinate system that rotates in accordance with a control angle that is a rotational angle used in a control;
a control angle calculation unit that obtains a current value of the control angle by adding an addition angle to an immediately preceding value of the control angle in each predetermined calculation cycle;
a steering angle detection unit that detects a steering angle of the steering mechanism;
a torque detection unit that detects a steering torque applied to an operation member that is operated to steer the vehicle;
a command steering torque setting unit that adjustably sets a command steering torque that corresponds to the steering angle detected by the steering angle detection unit based on a predetermined steering angle-torque characteristic; and
an addition angle calculation unit that calculates the addition angle based on a deviation of the detected steering torque detected by the torque detection unit from the command steering torque set by the command steering torque setting unit, the deviation being determined by subtracting the command steering torque from the detected steering torque,
wherein the addition angle based on the deviation is changed in such a manner that the detected steering torque or the command steering torque is changed when a predetermined condition is satisfied.

2. The vehicle steering apparatus according to claim 1, wherein the addition angle based on the deviation is changed in such a manner that the command steering torque is changed when an absolute value of the addition angle is equal to or larger than a predetermined value.

3. The vehicle steering apparatus according to claim 2, wherein the addition angle based on the deviation is changed in such a manner that the command steering torque and the steering angle are opposite in sign when the steering angle is within a predetermined steering angle region that includes a steering angle neutral point.

4. The vehicle steering apparatus according to claim 2, further comprising:

a rotation angular speed estimation unit that estimates a rotation angular speed of the motor; and a command steering torque correction unit that corrects the command steering torque based on the estimated motor rotation angular speed estimated by the rotation angular speed estimation unit.

5. The vehicle steering apparatus according to claim 4, wherein the command steering torque correction unit increases a correction amount of the command steering torque as the estimated motor rotation angular speed increases.

6. The vehicle steering apparatus according to claim 2, wherein the addition angle based on the deviation is changed in such a manner that the detected steering torque or the command steering torque is changed based on a steering speed of the steering mechanism.

7. The vehicle steering apparatus according to claim 6, wherein an absolute value of the detected steering torque or the command steering torque is decreased.

8. The vehicle steering apparatus according to claim 7, further comprising:

a control angle correction unit that corrects the control angle.

9. The vehicle steering apparatus according to claim 8, wherein the control angle correction unit decreases the control angle.

10. The vehicle steering apparatus according to claim 6, further comprising:

an axis command current correction unit that corrects the axis current value in the rotating coordinate system that rotates in accordance with the control angle.

11. The vehicle steering apparatus according to claim 1, wherein the motor generates a torque that corresponds to a difference between a rotational angle of the rotor and the control angle.

* * * * *